(12) United States Patent
Richards

(10) Patent No.: US 6,516,353 B1
(45) Date of Patent: Feb. 4, 2003

(54) SYSTEM AND METHOD FOR INTERACTIVE EDI TRANSACTIONS

(76) Inventor: Frederick R. Richards, 3905 Saddlehorn Dr., Columbus, OH (US) 43221

(*) Notice: Subject to any disclaimer, the term of this patent is extended or adjusted under 35 U.S.C. 154(b) by 0 days.

(21) Appl. No.: 09/285,371

(22) Filed: Apr. 2, 1999

(51) Int. Cl.[7] .................................................. G06F 9/46
(52) U.S. Cl. .................................... 709/310; 709/246
(58) Field of Search ................................ 709/246, 310; 707/500, 501, 506, 507, 508, 513, 515; 705/36–56

(56) References Cited

U.S. PATENT DOCUMENTS

| | | | | |
|---|---|---|---|---|
| 5,287,504 A | | 2/1994 | Carpenter et al. | 395/600 |
| 5,557,780 A | * | 9/1996 | Edwards et al. | 395/500.48 |
| 5,734,831 A | | 3/1998 | Sanders | 395/200 |
| 5,758,126 A | * | 5/1998 | Daniels et al. | 345/333 |
| 5,774,661 A | | 6/1998 | Chatterjee et al. | 395/200 |
| 5,794,234 A | * | 8/1998 | Church et al. | 707/4 |
| 5,799,297 A | | 8/1998 | Goodridge et al. | 707/1 |
| 5,848,393 A | | 12/1998 | Goodridge et al. | 705/8 |
| 5,963,915 A | * | 10/1999 | Kirsch et al. | 705/26 |
| 5,963,949 A | * | 10/1999 | Gupta et al. | 707/100 |
| 5,999,941 A | * | 12/1999 | Andersen | 707/103 |
| 6,026,417 A | * | 2/2000 | Ross et al. | 707/517 |
| 6,088,700 A | * | 7/2000 | Larsen et al. | 707/10 |
| 6,134,598 A | * | 10/2000 | Raman | 709/246 |
| 6,192,380 B1 | * | 2/2001 | Light et al. | 707/505 |
| 6,199,079 B1 | * | 3/2001 | Gupta et al. | 707/507 |
| 6,199,115 B1 | * | 3/2001 | DiRienzo | 709/236 |
| 6,240,441 B1 | * | 5/2001 | Beckett et al. | 709/200 |

* cited by examiner

Primary Examiner—Saleh Najjar
(74) Attorney, Agent, or Firm—Standley & Gilchrest LLP

(57) ABSTRACT

The present invention is a system and method for performing interactive EDI transactions across an Internet/Web based communications platform. The Web-based system and method of the present invention facilitates the communication of data between organizations that use EDI standards. A script for processing EDI data associated with a transaction is executed at a server to process EDI transaction data from another computer. A script execution component processes the EDI transaction data according to instructions provided in the script. The component that executes the script is located in accordance with a uniform resource locator.

19 Claims, 6 Drawing Sheets

SYSTEM AND METHOD FOR INTERACTIVE EDI TRANSACTIONS

BACKGROUND OF THE INVENTION

1. Field of the Invention

The present invention relates generally to communications platforms for performing EDI transactions and more particularly, an Internet/Web communications platform that supports interactive EDI transactions.

2. Description of Related Art

Electronic Data Interchange (EDI) facilitates the transfer of machine-readable information between computer systems. EDI standards were developed to streamline communications between business organizations. For example, healthcare service organizations such as providers, payers, managed care organizations, etc. often exchange documents that conform to EDI standards. For healthcare service organizations, EDI and other automation techniques reduce overhead by using technology to speed communications related to eligibility and benefit information, claims processing, referrals, authorizations, and remittance. Usually, an organization purchases special software that provides the functionality needed to translate data to an EDI format for further processing at another computer system. The actual formats required at various computer systems may vary so data formatting or mappings/translations specific to each of the computer systems with which an organization communicates may be required to complete all of its EDI transactions. Commercially available products such as PaperFree's WinMap Translator and WinMap Development products may be used to perform mapping and translation functions.

In many cases, an administrator manually performs the tasks that are required to prepare a data set or file for transfer and processing at another computer system. An administrator at the receiving computer system may also perform many tasks to process the received data. Whether at the sending or receiving computer system, an administrator may first perform file manipulation tasks that may be required by the receiving computer system. For example, the administrator may copy files, append files together, create empty files to receive data from another source, delete processed files, etc. The administrator may also encrypt, compress, or translate the data to another format. Commercially available software products may be used to perform some of the administrative functions. For example, Xceed Zip Compression Library may be used to perform compression and decompression functions.

The administrator may also perform mapping functions such that data is translated between or mapped from one format to another. Next, the administrator may perform tasks to complete the transfer of the data set or file to another computer system. For example, the administrator may perform an FTP process. Some administrators may create scripts or instruction sets to assist them in performing the required tasks. The scripts then perform many of the manual file and other manipulations that might otherwise be required for two computer systems to communicate and complete an EDI transaction.

Although EDI is widely used, organizations that use EDI for the exchange of information often need additional software to support the transmission and translation of data between internal and external computer systems. EDI standards relate to the format of data and are independent of underlying transport protocols that may be used to transmit data between computer systems. One problem with EDI, therefore, is a common communications platform for performing the data interchange. Typically, data is exchanged using a Value Added Network (VAN) with mailboxes. A requestor sends data to a mailbox and a responder looks for the data, processes it, and sends a response to the same mailbox. This process works well if timely responses to the requestor are not critical. This process does not work well for interactive communications or other situations in which a timely response is critical. For example, healthcare providers often require an immediate and timely response to questions regarding a patient's eligibility or benefits coverage.

The Internet and more specifically, the World Wide Web (Web) are platforms that are well suited for interactive communications. A Web page provides a common delivery platform between computer systems. However, the Internet/Web and the Hypertext-Transfer Protocol (HTTP) of the Web do not directly support EDI transactions. Therefore, there is a need for a system and a method of data transfer to support EDI transactions in an interactive Internet/Web based environment.

SUMMARY OF THE INVENTION

The present invention is a system and method for performing interactive EDI transactions across an Internet/Web based communications platform. The present invention is a Web-based system and method that facilitates the entry, transfer, and communication of data between organizations that use EDI standards. EDI transactions in the interactive environment of the Internet and Web are supported. The present invention comprises a plurality of software modules or components that communicate with one another to accomplish the features and functionality of the present invention. The software modules or components may be co-located on one computer or in some cases, may be distributed across computers that communicate, preferably, in accordance with Internet/Web protocols. Each computer involved in an EDI transaction in accordance with the present invention, in a preferred embodiment, executes a script for processing EDI data associated with a transaction. A script or instruction set operating on a first computer collects or obtains data for processing. One or more file manipulation, data formatting, compression/decompression, etc. tasks may be performed by the script. The unprocessed transaction/EDI data is transmitted from the first computer to a second computer (preferably, a Web server) for further processing in accordance with another script or instruction set operating at the Web server. Once again, one or more file manipulation, data formatting, compression/decompression, etc. tasks may be performed by the script. A script execution component associated with the URL or Web page of the Web server runs or executes the script. The script executing or running at the Web server may process the EDI data at the Web server in accordance with a business function or application also at the Web server. The processed transaction/EDI data is then transmitted from the Web server to the first computer. The EDI transaction is then complete.

Another component of the present invention is used to develop scripts for execution in accordance with the present invention. A graphical user interface tool for building scripts allows for a lot of functions that would require extensive programming otherwise. This type of programming is out of the capabilities for small- and medium-sized companies and therefore, represents a significant advantage for small- and medium-sized companies that would like to automate the process of performing EDI transactions.

BRIEF DESCRIPTION OF THE DRAWING(S)

DETAILED DESCRIPTION OF THE PREFERRED EMBODIMENT(S)

Figure 1:
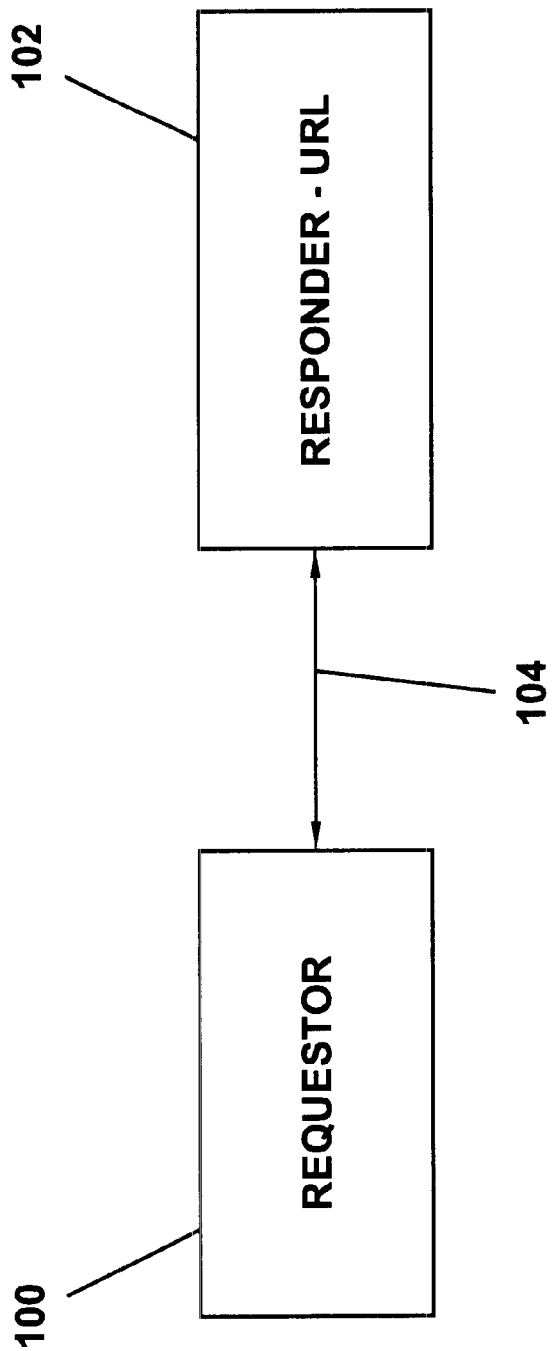
FIG. 1 is a high level block diagram of the components for processing an EDI transaction in accordance with a preferred embodiment of the present invention.

Referring to FIG. 1, a high level block diagram of the components for processing an EDI transaction in accordance with a preferred embodiment of the present invention is shown. A Requestor computer 100 that is executing a Web browser may present information or data to a Responder computer (Web server) 102 using a Uniform Resource Locator (URL) and the HyperText Transfer (HTTP) protocol over the Internet 104. When the Requestor computer 100 sends a HTTP request with the specified URL request to the Responder Web server 102, the Responder Web server sends back a Web or HTML page for viewing through the Requestor computer's Web browser. The Web page contains the information requested. As used herein, the Internet may be an intranet or an extranet. Intranets and extranets are different networks that all use the same technology to move data across a common open network. Communications between computers may be accomplished using commercially available products such as Mabry Software's Internet Package or Cresent's PDQ Communications which may be integrated with or used in conjunction with the various software components of the present invention.

Figure 2:
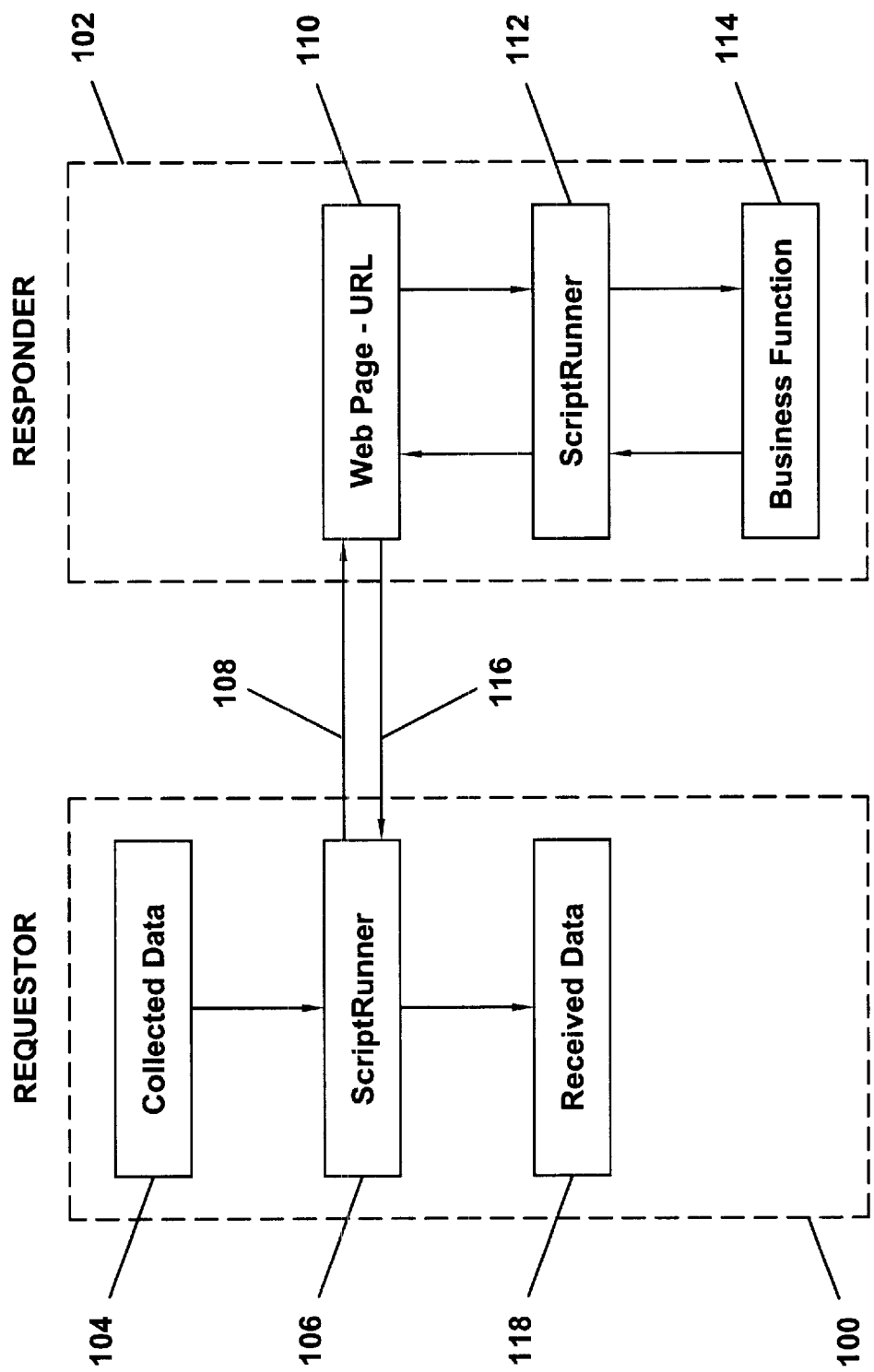
FIG. 2 is a diagram of the data flow between the primary components of a preferred embodiment of the present invention.

Referring to FIG. 2, a diagram of the data flow between the primary components of a preferred embodiment for the present invention is shown. In the first step, the Requestor computer 100 collects the EDI data to send to the Responder computer 102. The data may be collected from a variety of sources. It may be obtained from one or more files stored on the Requestor computer, an operator at the Requestor computer may enter it, or it may be obtained from another computer in communication with the Requestor computer. In the next step, the EDI Collected Data 104 (or unprocessed transaction/EDI data) is then sent to a script execution component (ScriptRunner) 106 or other software module adapted to process or manipulate the Collected Data 104 in accordance with a set of instructions. In a preferred embodiment of the present invention, a component adapted to execute or run scripts (i.e., script execution component or ScriptRunner 106) performs the various tasks associated with a set of instructions for manipulating and processing the EDI Collected Data 104. A function in the ScriptRunner component 106 identified by a script name is called with the Collected Data 104. The ScriptRunner component 106 executes or runs the named script. The named script further includes a URL that identifies a Web page at a Responder computer 102 for further processing of the Collected Data 104. In the next step, the ScriptRunner sends a transaction including the Collected Data across a first Internet communication link 108 to the desired Web page-URL component 110 at the Responder computer 102. Preferably, the data transfers across the communication link 108 occur in conformance with the TCP/IP protocol of the Internet.

In the next step, the Web Page-URL component 110 at the Responder computer 102 calls a script execution or ScriptRunner component 112 with the data received from the Requestor computer 100 and a script name. The ScriptRunner component at the Responder computer 102 performs the instructions of the script and in the next step, may call a Business Function component 114. The Business Function component 118 is adapted to perform one or more tasks that may be required to create a processed EDI transaction to be returned to the Requestor computer 100. After the Business Function component 114 creates the transaction, the transaction is returned to the ScriptRunner component 112 for further processing. The ScriptRunner component 112 completes the remaining tasks for the script and, in the next step, returns the EDI transaction to the Web Page-URL component 110. In the next step, the Web Page-URL component 110 of the Responder computer 102 returns the processed transaction/EDI data across an Internet communication link 116 to the ScriptRunner component of the Requestor computer 100. The ScriptRunner component 106 of the Requestor computer completes processing of the instructions in the script. Finally, in the last step, the Received Data (or processed transaction) 118 that came to ScriptRunner component from the Responder computer 102 may be returned to an application program, file, etc.

Figure 3:
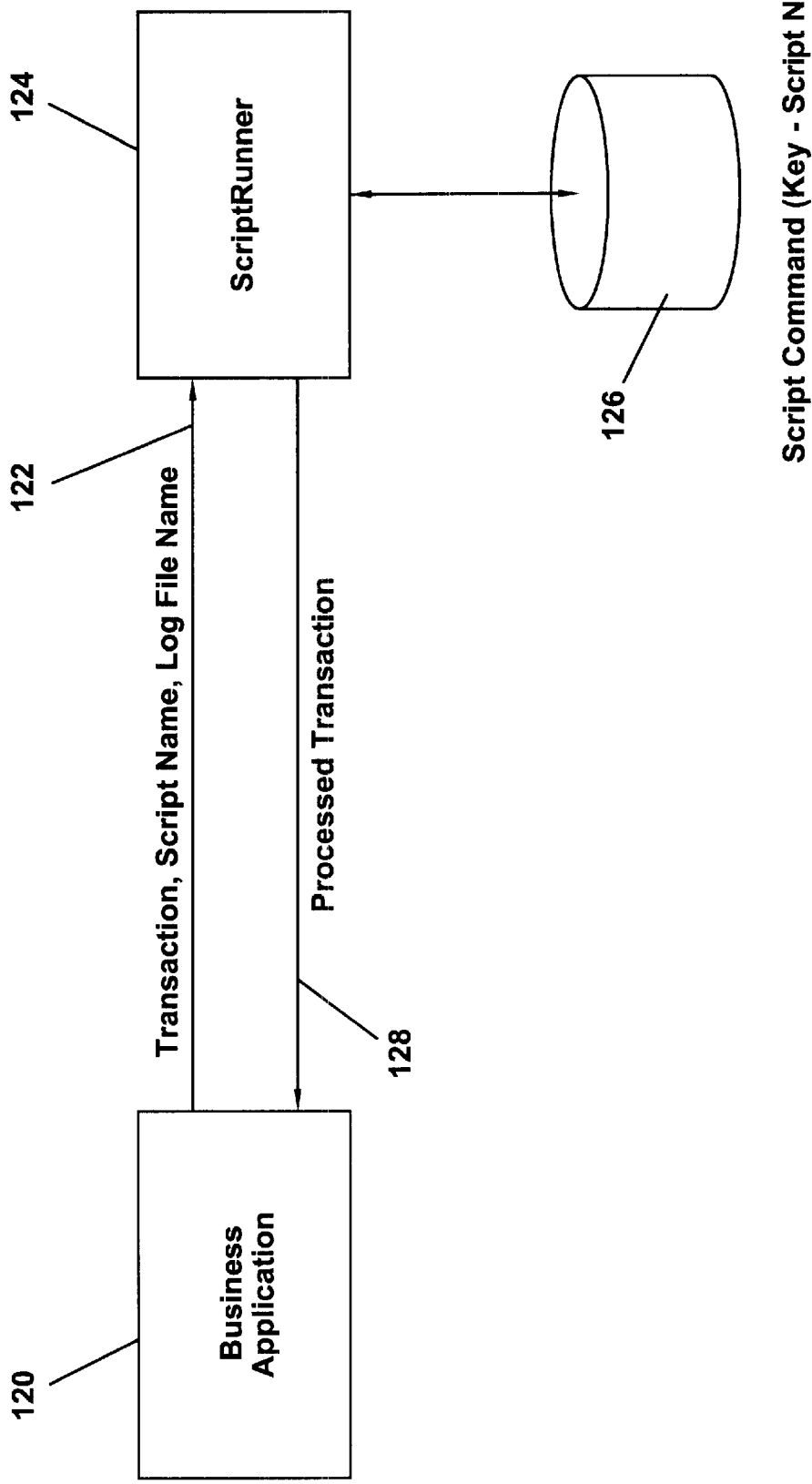
FIG. 3 is a block diagram of components for processing a requestor EDI transaction in accordance with a preferred embodiment of the present invention.

Referring to FIG. 3, a block diagram of components for processing a requester EDI transaction in accordance with a preferred embodiment of the present invention is shown. In a preferred embodiment of the present invention, a Business Application component 120 that operates on a requester computer calls a ScriptRunner component 124 with parameters or data comprising Transaction Data, a Script Name, and a Log File Name 122. Preferably, the Log File Name 122 is an optional parameter. The ScriptRunner component 124 compiles a list of commands from a Script Command database 126. The ScriptRunner component 124 then executes each of the commands appearing in the script. After the script is executed, the Processed Transaction 128 (i.e., the Transaction as processed in accordance with the script instructions) is returned to the Business Application component 120.

Figure 4:
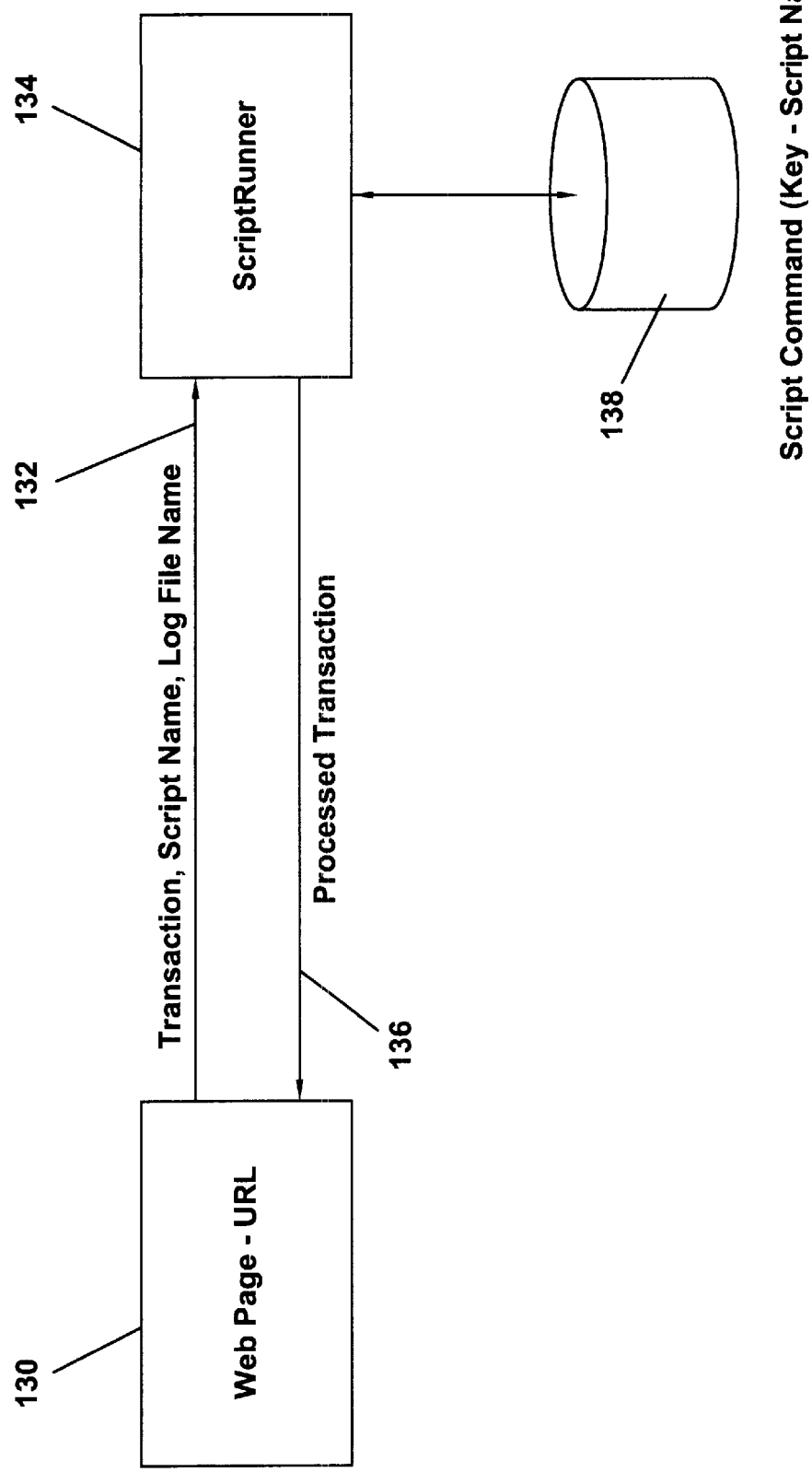
FIG. 4 is a block diagram of components for processing a responder EDI transaction in accordance with a preferred embodiment of the present invention.

Referring to FIG. 4, a block diagram of components for processing a responder EDI transaction in accordance with a preferred embodiment of the present invention is shown. Once an incoming transaction from a requestor computer hits the Web Page-URL component 130, the ScriptRunner component 134 of the responder computer is called with data or parameters comprising a Transaction, Script Name, and an optional Log File Name 132. The ScriptRunner component 134 accesses a Script Command database 138 to obtain a list of commands to be executed. After the commands are executed, the ScriptRunner component 134 returns the Processed Transaction 136 back to the Web Page-URL component 130. The Web Page-URL component 130 then returns the Processed Transaction 136 back to the requester computer.

Figure 5:
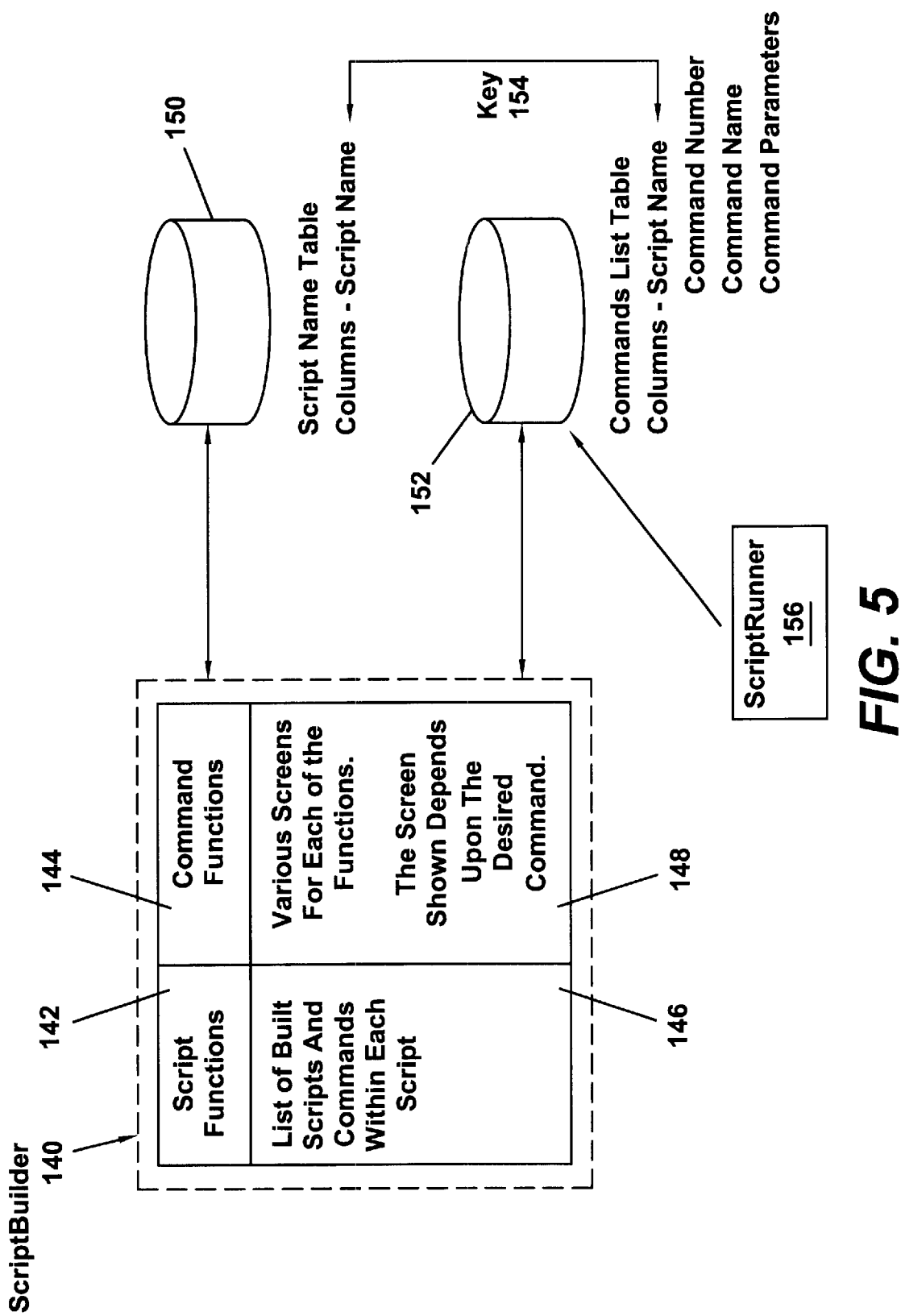
FIG. 5 is a diagram of components for building scripts or instruction sets for EDI transactions in accordance with a preferred embodiment of the present invention.

Referring to FIG. 5, a diagram of components for building scripts or instruction sets for EDI transactions in accordance with a preferred embodiment of the present invention is shown. In a preferred embodiment of the present invention, a program or tool (ScriptBuilder 140) that provides a graphical user interface is used to develop the scripts used by the ScriptRunner component 156 of the present invention. A ScriptBuilder tool may be developed using Microsoft's Visual Basic Development product. In a preferred embodiment of a ScriptBuilder program 140, there are four components. A first component, Script Functions 142, performs functions that are applicable to the script. A second component, Command Functions 144, manages the development of the commands within the script. A third component, List of Built Scripts 146, section shows all of the different scripts built within ScriptBuilder 140. The last component, Screens for Functions 148, displays different screens based upon the command.

In a preferred embodiment of the ScriptBuilder component, the Script Functions 142 are shown in an upper left quadrant of a ScriptBuilder window. Script Functions 142 performs functions such as adding a new script, printing a script, deleting scripts, importing and exporting scripts, and script level help. When a script is added, the new script name is added to a Script Name Table 150, which is stored in a database or file. The associated commands are stored in a Command List Table 152 stored in a database or file. When a delete function is chosen, the script name is deleted from the Script Name Table 150 and the associated commands are deleted from the Command List Table 152.

Command Functions 144 are preferably shown in the upper right quadrant of a ScriptBuilder window. Command Functions 144 performs functions such as choosing a new command to add to the script (e.g., done through a drop down box), save the current command being added or updated, delete the current command, add an error command, close the current command screen, mark the current command for non-execution or execution, and provide command level help. The error command adds commands that will occur when an error occurs. The save command adds or updates the command in the Command List Table 152. The delete command deletes the entry in the Command List Table 152. The current command screen being shown is closed with the close window function. Commands may also be marked for being executed or not executed when the script is executed. This function makes for easier testing and re-running of scripts.

The List of Scripts 146 is preferably shown in the lower left quadrant of a ScriptBuilder window. Preferably, the list of scripts and commands is shown through a tree view. Under each script, a list of commands is shown when requested by the user. This screen may also provide a method of copying the commands from one script to another script using a drag and drop method.

The Various Screens 148 is preferably shown in the lower right quadrant of a ScriptBuilder window. Typically, each of the different commands requires different parameters for execution.

Preferably, the Script Name Table 150 is used to store one entry for each script name. The separate table, which only contains one column, is for faster SQL execution in tracking the list of scripts.

The Command List Table 152 is used to store the list of commands for each of the scripts. Preferably, the Command List Table is comprised of four columns. The first column comprises script names that tie together the different commands for one script. The second column comprises script numbers that indicate the execution order of the different commands. The third column comprises command names that indicate what commands will be executed. The fourth column comprises command parameters that show the different command parameters to be executed. The different parameters are separated, preferably, by spaces.

In a preferred embodiment of the present invention, the ScriptRunner component 156, whether on a requestor computer or a responder computer, is an in-process ActiveX control. As an ActiveX control, the ScriptRunner component may be used anywhere an ActiveX control may be used. When the ScriptRunner is associated with a Web page, such as through an ActiveX control referenced in a Web page, as disclosed herein, the benefits and advantages of the present invention may be realized. Alternatively, a Java applet or servlet may be used to obtain the benefits and advantages of the present invention. Below is a list of the different commands that can be built using ScriptBuilder and executed through the ScriptRunner component for a preferred embodiment of the present invention.

Reconciliation—the 997 process logs the original transaction, logs the 997 transaction received as the result of sending a transaction, reconciles the 997 against the transaction sent, and runs a reconciliation report.

Append File—copies a file to the end of another file.

Call Pager—calls a pager for error conditions or other notifications.

Copy File—copies the file from one location to another location. This command is most important for crating backups and logs of the processing.

Create Empty File—creates an empty file to be used to send back empty files when there should not be any data returned.

Delete File—deletes any files as indicated.

Encryption—encrypts or decrypts files and in-process transactions.

FTP File—FTP process for moving files from one location to another.

If Condition—checks for empty files or if the file exists.

Obtain URL—sends data to an URL and receives the data back from the URL.

Pause Process—stops the command for the indicated number of milliseconds.

Run WinMap—WinMap is a translation product by Paper-Free. This command provides for the abilities to call maps in a real time mode.

Run Telecom Script—create a telecommunications script that performs asynchronous and synchronous communications.

Run Another Job—runs another other EXE type program.

Send Email—sends email to notify of error conditions and sends file attached emails or any other type of communications.

Socket Client—provides the ability to send a transaction to a socket server.

Zip File—compresses and uncompresses files is provided. In many conditions, a transaction is compressed for faster transmissions.

Figure 6:
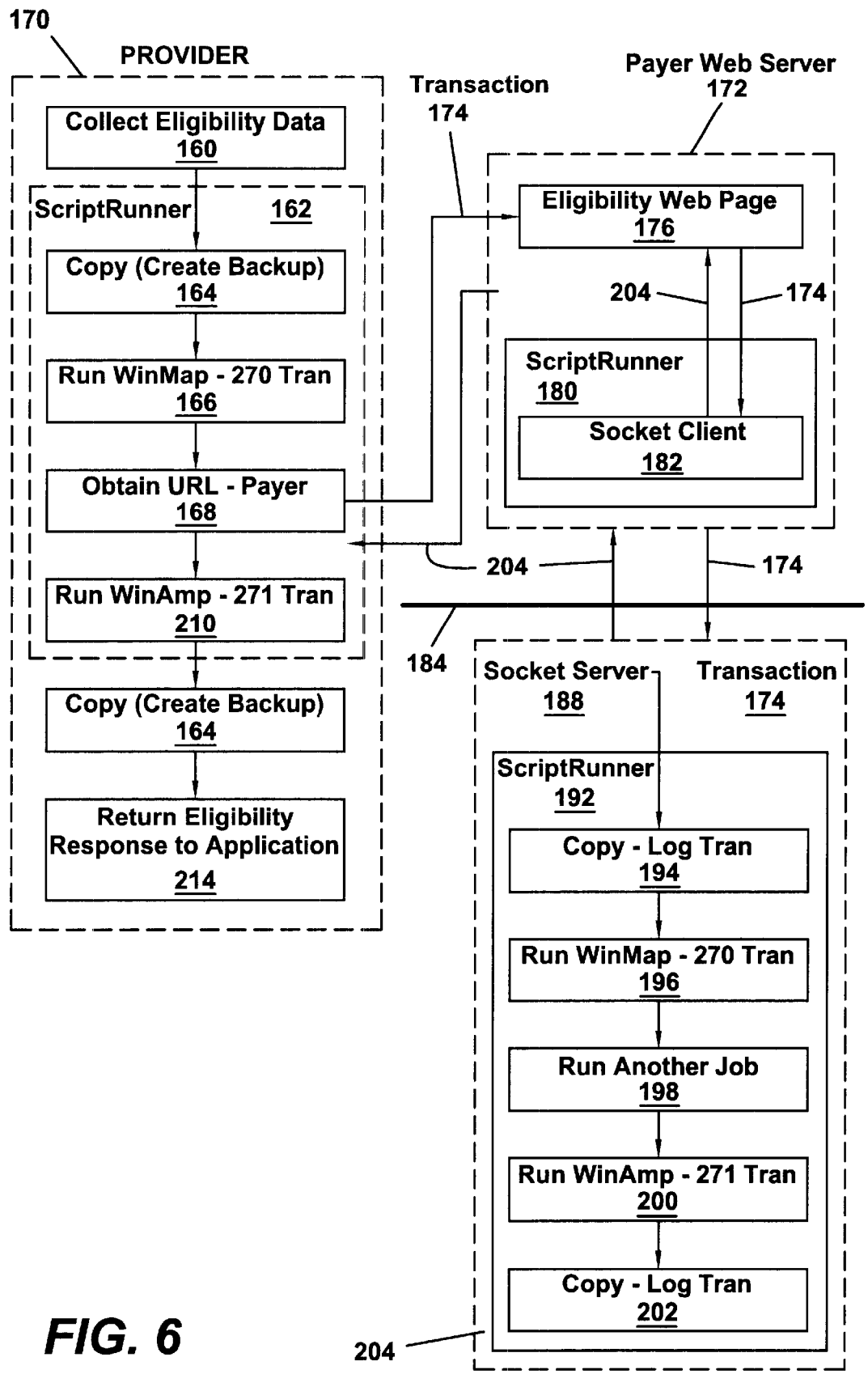
FIG. 6 is a detailed diagram of components for processing an EDI transaction in accordance with a preferred embodiment of the present invention.

Referring to FIG. 6, a detailed diagram of components for processing an EDI transaction in accordance with a preferred embodiment of the present invention is shown. An example of the using of the ScriptRunner component and other components in a healthcare industry check for eligibility verification is provided to illustrate the features and functionality of the present invention. The transaction needs to occur quickly for the provider to assess financial liability for a patient that just walked through the door.

The process begins with a software module or component executing on the Provider computer system 170 that collects the Eligibility Data 160 necessary to create the transaction. After the Eligibility Data is collected using the Eligibility Data component 160, the application calls a ScriptRunner component 162 that performs the tasks associated with a named script. First, the ScriptRunner component 162 creates a copy backup of the transaction using a Copy (Create Backup) component 164 to show what information was sent to the Payer Web Server 172. The transaction with the Eligibility Data is then sent to a Run WinMap-270 Translation component 166 to have the transaction data mapped or translated into an ASC X12 ANSI 270 Transaction. An Obtain URL-Payer component 168 then sends the Transaction 174 through a communication link that operates, preferably, in accordance with the TCP/IP protocol of the Internet. The Transaction 174 is received at the Payer Web Server 172 where it is processed at the Payer Web Server's Eligibility Web Page component 176. The Eligibility Web Page component 176 calls a ScriptRunner component 180 to further process the transaction. In a preferred embodiment of the present invention, the ScriptRunner component at the Payer Web Server 172 is an ActiveX control.

An interesting challenge for the Payer Web Server 172 is that it cannot have thousands of providers going through its firewall into its internal application for processing eligibility requests. This would pose to high a security risk. Therefore, in a preferred embodiment of the present invention, there are two ScriptRunner components 180, 192 at the Payer site. The first ScriptRunner component 180 is at the Payer Web Server 172. It takes the Transaction 174 and performs a sockets function through a Socket Client component 182 at the Payer Web Server 172. The Transaction 174 passes through the Firewall 184 to a Socket Server component 188 on the other side. This allows the Firewall 184 to be constructed such that only the socket connection from the Payer Web Server 172 is allowed through the Firewall 184. In this preferred embodiment of the present invention, security conditions are much higher.

The Socket Client component 182 functions in the ScriptRunner component 180 call the Socket Server 188. The Socket Client component 182 makes the call through the Firewall 184. At this location, the Payer Web Server 172 performs the process of collecting the data and creating the transaction to return. The Socket Server component 188 calls the ScriptRunner component 192. The ScriptRunner component 192 then runs through a called script. First, a copy of the Transaction 174 is made by a Copy-Log Tran component 194. The next step maps or translates the Transaction using a Run WinMap-270 Translation component. A Run Another Job component 198 performs a business function, for example, to collect the data from an internal function. A Run WinMap-271 Translation component 200 translates the transaction data into an ASC X12 ANSI 271 Transaction. A Copy-Log Tran component 202 makes a backup of the Processed Transaction 204 out of the translator.

The ScriptRunner Component 192 sends the Processed Transaction 204 to the Socket Server component 188. The Socket Server component 188 sends the Processed Transaction 204 back to the Socket Client component 182. The ScriptRunner component 180 sends the Processed Transaction 204 to the Eligibility Web Page component 176. The Eligibility Web Page component 176 returns the Processed Transaction 204 back to the ScriptRunner component 162 at the Provider computer system 170 location in the Obtain URL-Payer component 168.

The Obtain URL-Payer component 168 sends the Processed Transaction to the Run WinMap-217 Translation component 210. The ScriptRunner component creates a copy backup copy of the Processed Transaction using the Copy (Create Backup) component 164 and then returns the processed data back to the application using a Return Elig Response to Application component 214. The healthcare provider then learns, almost immediately, the financial liability for the patient that just walked through the door.

For organizations that use EDI for exchange of information, the present invention provides relevant information between two parties in a more timely manner than in prior art systems. The present invention adapts EDI transactions for execution in an Internet/Web based environment so that the exchange of information occurs virtually in real-time or interactively. The present invention may be used for processing of any type of EDI transaction including healthcare, business, insurance, etc. transactions. The software components of the present invention facilitate the processing of EDI transactions through a Web page thereby accomplishing the benefits and advantages of the present invention.

The present invention has been disclosed with reference to the disclosed embodiments. It will be apparent to one skilled in the art that variations and modifications may be made without departing from the invention in its broader aspects.

What is claimed is:

1. A system for performing an EDI transaction across an Internet communications platform, comprising:

a first computer for collecting data for an unprocessed EDI transaction;

a second computer for accepting said unprocessed EDI transaction;

a communication link between said first computer and said second computer for transmitting said unprocessed EDI transaction from said first computer to said second computer in accordance with a uniform resource locator;

a first script execution component at said first computer adapted to execute a script selected in accordance with a name and comprising said uniform resource locator and transmit said unprocessed EDI transaction comprising said collected data across said communication link to a web page component at said uniform resource locator and receive processed EDI transaction data;

a second script execution component at said second computer, said script execution component associated with said web page component at said uniform resource locator and adapted to process said collected data for said unprocessed EDI transaction and return said processed EDI transaction to said web page component at said uniform resource locator.

2. The system of claim 1 wherein said processed EDI transaction is transmitted from said second computer to said first computer using said communication link.

3. The system of claim 2 further comprising an application at said first computer adapted to accept said processed EDI transaction for further processing.

4. The system of claim 1 wherein said first script execution component and said second script execution component is an ActiveX control.

5. The system of claim 1 wherein said first script execution component and said second execution script is a Java applet.

6. The system of claim 1 further comprising a first script adapted for execution by said first script execution component and a second script adapted for execution by said second script execution component.

7. The system of claim 6 wherein said scripts are built using a graphical user interface tool.

8. The system of claim 1 wherein said first script execution component at said first computer is adapted to collect said unprocessed EDI transaction data.

9. A method for performing an EDI transaction across an Internet communications platform, comprising the steps of:
   a) collecting unprocessed EDI transaction data at a first computer;
   b) executing at said first computer a first script execution component using a first script selected in accordance with a name and that comprises said uniform resource locator associated with a second computer;
   c) transmitting in accordance with said first script said unprocessed EDI transaction data to a web page component at said uniform resource locator;
   d) executing at said second computer a second script in accordance with a second script execution component to process said unprocessed EDI transaction data;
   e) transmitting processed EDI transaction data to said web page component at said uniform resource locator;
   f) returning processed EDI transaction data from said web page component at said uniform resource locator to said first script execution component at said first computer.

10. The method of claim 9 wherein the step of executing at said first computer a first script execution component using a script that comprises said uniform resource locator comprises the step of executing an ActiveX control with a web page component identified by said uniform resource locator.

11. The method of claim 9 wherein the step of executing at said first computer a first script execution component using a script that comprises said uniform resource locator comprises the step of executing a Java applet with a web page identified by said uniform resource locator.

12. The method of claim 9 wherein said first and second scripts are developed using a graphical user interface tool.

13. The method of claim 9 wherein the step of collecting unprocessed EDI transaction data comprises the step of executing a script to collect said unprocessed EDI transaction data.

14. The method of claim 9 wherein the step of transmitting said unprocessed EDI transaction data comprises the step of establishing a communication link between said first and second computers in accordance with the TCP/IP protocol.

15. A system for interactive processing of EDI transactions, comprising:
   a first computer with a first script execution component adapted to transmit unprocessed EDI transaction data in accordance with a script selected in accordance with a name and that identifies a uniform resource locator and receive processed EDI transaction data from a web page component associated with a uniform resource locator;
   a second computer adapted to accept said unprocessed EDI transaction data in accordance with said uniform resource locator;
   a second script execution component at said second computer for processing said unprocessed EDI transaction data, said second script execution component associated with said uniform resource locator and adapted to process said unprocessed EDI transaction data and return processed EDI transaction data to said first computer through said web page component associated with said uniform resource locator.

16. The system of claim 15 wherein said second script execution component is adapted to perform EDI translation functions.

17. The system of claim 15 wherein said second script execution component is adapted to perform file manipulation functions.

18. The system of claim 15 wherein said first and second script execution components are components selected from the group of consisting of ActiveX controls and Java applets.

19. The system of claim 15 wherein said EDI transaction data comprises data for processing healthcare eligibility and benefit information, claims processing, referrals, authorizations, remittance, and first reports of injury.

* * * * *